United States Patent Office 2,912,401
Patented Nov. 10, 1959

2,912,401

STRIPPING SOLVENT FROM ISOBUTYLENE-ISO-PRENE COPOLYMER LATICES

Clyde Lee Aldridge, Baker, and Edward Allen Hunter, Baton Rouge, La., assignors to Esso Research and Engineering Company, a corporation of Delaware No Drawing. Application May 8, 1956
Serial No. 583,362

6 Claims. (Cl. 260—29.7)

This invention relates to a method for preparing latices from hydrocarbon polymers and more particularly relates to an improved method for stripping solvent from the raw emulsion used in preparing the latex.

It is well known that polymers may be dissolved in a suitable solvent and this solution then emulsified with water to give an emulsion from which the solvent can be removed to leave a stable latex. More recently it has been proposed that the solid polymer may be dissolved directly in an emulsion of the solvent and water from which the solvent can likewise be stripped to give the latex.

In either case the solvent is stripped out by heat. In order to reduce the temperature and thus prevent polymer agglomeration, the stripping is done under vacuum. Unfortunately, however, this introduces difficulties due to foaming. All of these difficulties mean that stripping of the latex to high solids content is often unattainable.

It has now been found that the above difficulties can be overcome by adding to the emulsion either before or during stripping a compound which will form an azeotropic mixture with the solvent and remove the solvent at a much lower temperature thus obviating the use of vacuum and avoiding the resultant foaming difficulties.

The polymers which may be emulsified in accordance with the present invention include polyisobutylene, various synthetic rubbers such as butyl rubber (a generic term applied to vulcanizable elastic copolymers of isobutylene and small amounts of diolefins; see Hackh's Chemical Dictionary, 3rd edition, page 151. A usual type of butyl rubber is a vulcanizable elastic copolymer of a major amount of isobutylene and a minor amount of isoprene, e.g. a copolymer of 97% isobutylene and 3% isoprene), GR–S (a copolymer of butadiene and styrene prepared by emulsion polymerization), polybutadiene and copolymers of butadiene and styrene prepared by mass polymerization with sodium, GR–N or Paracril (a copolymer of butadiene and acrylonitrile prepared by emulsion polymerization), and resins such as the copolymers of isobutylene and styrene (prepared at low temperatures with Friedel-Crafts catalysts) and petroleum resins (prepared from steam-cracked petroleum streams such as naphtha, kerosene, or gas oil by the use of Friedel-Crafts catalysts at low temperatures) as well as any other water-insoluble solid polymer.

The solvents which may be used to dissolve the polymer will depend upon the particular polymer. For example, the rubbery hydrocarbon polymers will dissolve in all types of hydrocarbon solvents, carbon disulfide, and carbon tetrachloride. Paracril is soluble in methyl ethyl ketone, and the copolymer of isobutylene and styrene is soluble in aromatic hydrocarbons and in the halogenated solvents. Thus the suitable solvents which may be used, depending upon the particular polymer, include the hydrocarbon solvents, hexane, heptane, octane, isooctane, the nonanes, the decanes, naphtha fractions, benzene, toluene, Varsol, Solvesso 100, Solvesso 150, cyclohexane, cyclohexene; the chlorinated solvents, methyl chloride, ethyl chloride, trichlorethylene, and carbon tetrachloride; carbon disulfide, methyl ethyl ketone and the like. More volatile solvents can be used but are undesirable since refrigeration is required to keep them from evaporating.

The azeotroping agent to be added to the emulsion will depend primarily upon the specific solvent being used and the temperature desired during the stripping. Generally as low a temperature as possible is desired since the higher the temperature the greater the danger of coagulating the polymer. When a hydrocarbon is used as the solvent then suitable azeotroping agents include methyl alcohol, methyl acetate and ethyl acetate or other water-soluble hydrocarbon-insoluble diluent which distills azeotropically with the hydrocarbon.

In the practice of the invention the azeotroping agent may be added to the emulsion after it has been prepared, either before or during the stripping operation. However, it is one feature of the present invention to use a mixture of methanol and water as the continuous phase in preparing the emulsion. Methanol is unique in that it is the only water-soluble, hydrocarbon-insoluble compound which has been found capable of replacing a large portion of the water in preparing the emulsion. In this case, not only is the hydrocarbon distillable at a lower temperature at atmospheric pressure, but also the distillation of water to achieve desirable high solid content latices is avoided. The methanol portion of the continuous phase is removed as the azeotrope at a conveniently low temperature at atmospheric pressure. The methanol may be used in a ratio of one volume for every two to five volumes of water or every 2.6 to 9.6 volumes of hexane. The emulsion may be prepared by the usual technique in which a solution of the polymer in a suitable solvent is added to a mixture of water and methyl alcohol and agitated in the presence of emulsifying agents until the emulsion is formed.

The emulsion may also be prepared in accordance with the technique disclosed in Ser. No. 578,965, filed April 18, 1956, in the names of Hunter, Lambert, Segura and Small in which the solid polymer, which in the case of butyl rubber is preferably in the form of wet crumb, is dissolved directly in an emulsion of water, polymer solvent and methanol. The polymer dissolves in the dispersed solvent and the solution of polymer in solvent forms as a dispersion in the mixture of water and methyl alcohol as the continuous phase.

In preparing the emulsion, the components may be blended in any type of equipment which gives violent agitation, such as a colloid mill, a dispersator, a Waring Blendor and the like. A particularly suitable type of equipment has been found to be a sonic mixer known as the Rapisonic Homogenizer. This consists of a gear pump which forces the materials through an orifice and impinges the stream on a knife edge, vibrating blade, encased in a resonating bell. The energy of vibration is obtained from the force of the stream striking the blade.

Regardless of the technique used in preparing the emulsion, the azeotroping agent is now added, if not already present, and the mixture is stripped at atmospheric pressure and low temperature with wet nitrogen or steam to remove the solvent as a low boiling azeotrope. For example, if a hydrocarbon polymer dissolved in hexane has been emulsified with water and methanol has been added as the azeotroping agent, then a mixture of 72% hexane and 28% methanol boils at 50.6° C., instead of 68.9° C., the boiling point of hexane. Similarly, if heptane is used as the solvent then an azeotropic mixture of 48% heptane and 52% methanol boils at 59.1° C. instead of 98.5° C., the boiling point of heptane.

The advantages of the invention will be better understood from a consideration of the following experimental data which are given for the sake of illustration, but without intention of limiting the invention thereto.

Example I

A solution of two liters of 23 wt. percent butyl rubber in hexane containing 11.6 grams of oleic acid was emulsified in a mixture of 582 cc. of methanol and 1418 cc. of water to which the following emulsifiers had been added:

2.3 grams of potassium hydroxide
5.3 grams of Triton X-100 (a polyoxyethylated nonyl phenol containing 8 to 10 ethylene oxide units)
7.6 grams of polyvinyl alcohol The rubber solution was added to the water-methanol mixture in a sonic mixer and recycled at the rate of about 4 gallons per minute. After the emulsion was prepared an additional 5.3 grams of Triton X-100 was added. The emulsion was then stripped at atmospheric pressure to 77° C. with a stream of nitrogen to remove the hexane and methanol as an azeotrope which separates spontaneously into an upper hydrocarbon layer and a lower methanol-water layer. The finished latex had a rubber content of 20.0%.

Example II

A solution of two liters of 23% butyl rubber in hexane was emulsified with a mixture of 639 cc. of water and 161 cc. of methanol by circulating through a sonic mixer according to the recipe of Example I, except that the amount of polyvinyl alcohol was increased to 9.0 grams. Three minutes were used for the addition of the rubber solution to the water-methanol mixture and circulation was continued for three minutes at the rate of 4 gallons per minute. An additional 5.3 grams of Triton X-100 was added to the completed emulsion. The emulsion was stripped in a five-liter flask equipped with a stirrer to a pot temperature of 100° C. and atmospheric pressure until no more hexane distilled. The finished latex had a rubber content of 40.6%.

The nature of the present invention having been thus fully set forth and specific examples of the same given, what is claimed as new and useful and desired to be secured by Letters Patent is:

1. Process for preparing a vulcanizable elastic copolymer of isobutylene and a minor amount of isoprene latices which comprises emulsifying 1 liter of a solution of said copolymer in hexane with about 0.4 to 1 liter of a mixture consisting of 2 to 5 volumes of water and 1 volume of methanol, distilling the resulting emulsion at a temperature lower than the boiling point of hexane until no more hexane-methanol azeotrope is removed and recovering a copolymer latex and a distillate consisting of a hexane-methanol azeotrope.

2. Process according to claim 1 in which the distillate contains a portion of the water and the latex contains between about 20 and 40% of said copolymer.

3. Process according to claim 1 in which the latex contains about 40% of said copolymer.

4. Process for preparing latices of an elastic copolymer of a major amount of isobutylene and a minor amount of isoprene which comprises emulsifying with water a solution of said copolymer in hexane and distilling the resulting mixture in presence of one volume of methanol for each 2.6 to 9.6 volumes of hexane whereby the hexane is removed as an azeotrope with methanol at a temperature lower than the boiling point of hexane, leaving a dispersion of copolymer in water as the desired latex.

5. Process for preparing latices of an elastic copolymer of a major amount of isobutylene and a minor amount of isoprene which comprises dissolving solid particles of said copolymer in an emulsion of hexane and a solution of water and methanol, said solution containing one volume of methanol for each 2.6 to 9.6 volumes of hexane, whereby the copolymer dissolves in the hexane and the solution of copolymer and hexane forms as a dispersed phase in water, distilling the dispersion whereby the hexane is removed as the azeotrope with methanol at a temperature lower than the boiling point of hexane, leaving a dispersion of copolymer in water as the desired latex.

6. Process for preparing latices of an elastic copolymer of a major amount of isobutylene and a minor amount of isoprene which comprises emulsifying a solution of said copolymer in hexane with a mixture of water and methanol, said mixture containing one volume of methanol for each 2.6 to 9.6 volumes of hexane and distilling the resulting emulsion to separate the hexane-methanol azeotrope and leaving a dispersion of copolymer in water.

References Cited in the file of this patent
UNITED STATES PATENTS 2,296,427 Daniel et al. _____ Sept. 22, 1942
2,799,662 Ernst et al. _____ July 16, 1957

OTHER REFERENCES

Raff et al.: "Polyethylene," Interscience Publishers, Inc., New York City (1956), volume XI, pages 258–260.
Lange: "Handbook of Chemistry," 9th edition, Handbook Publishers Inc. (1956), pages 1487–1488.